UNITED STATES PATENT OFFICE.

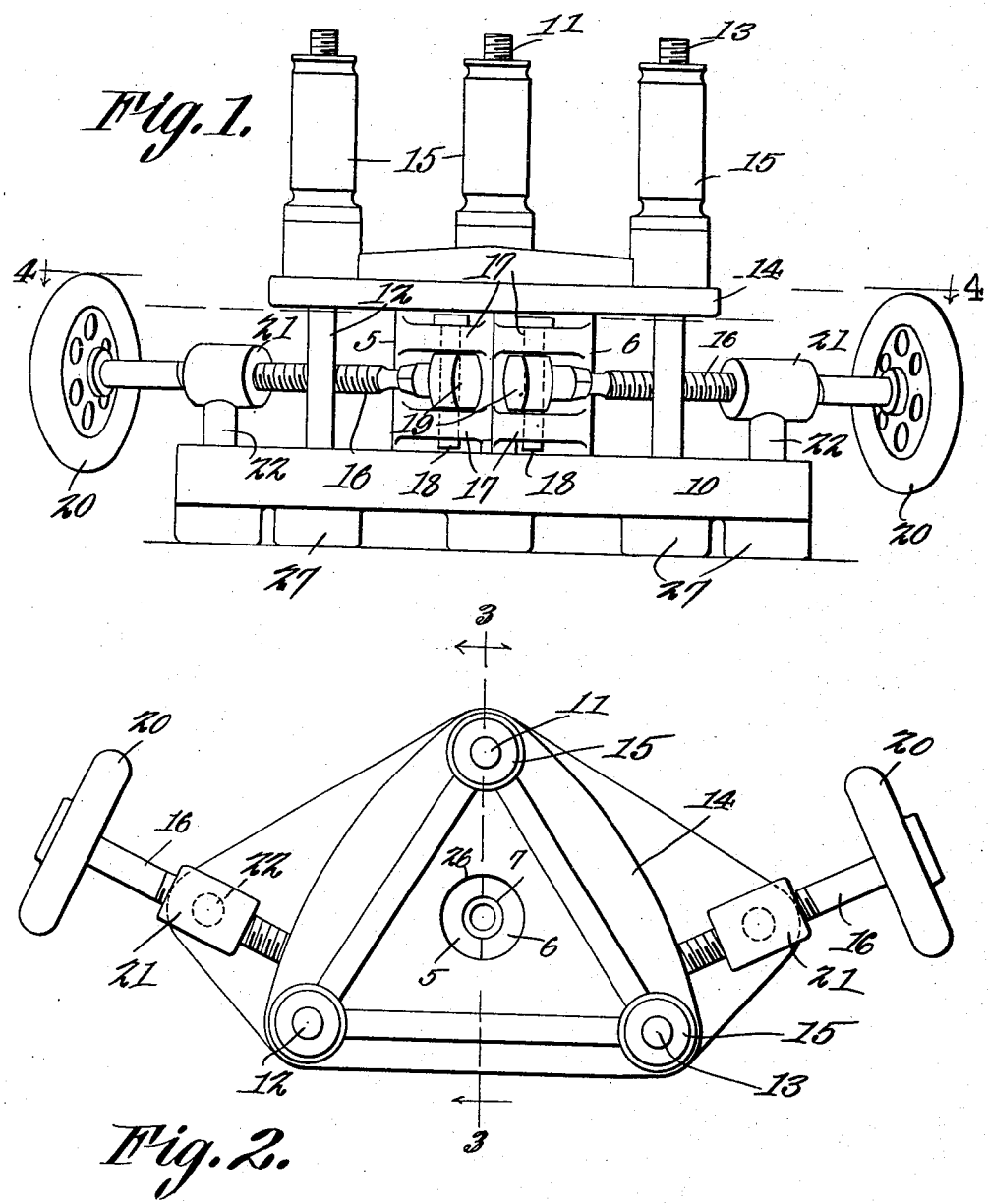

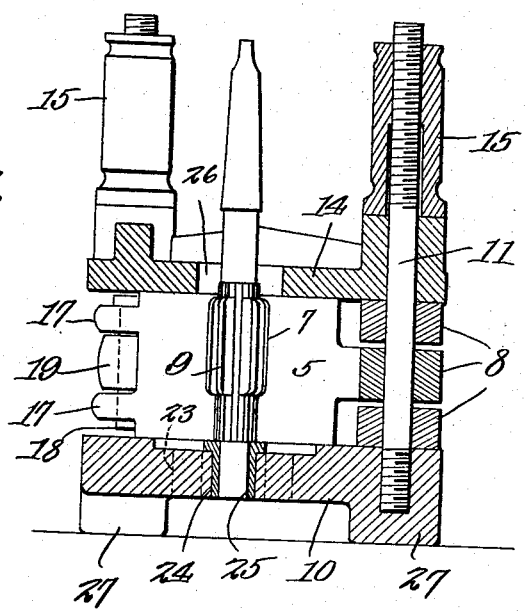
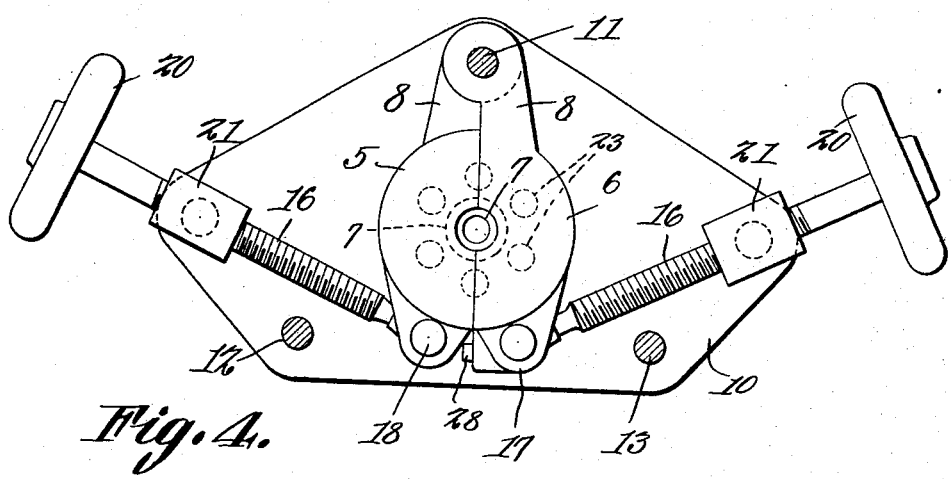

ALBERT R. BETHEL, OF WESTPORT, MARYLAND.

APPARATUS FOR MILLING BOTTLE-MOLDS.

1,219,227. Specification of Letters Patent. Patented Mar. 13, 1917.

Application filed May 12, 1916. Serial No. 96,993.

*To all whom it may concern:*

Be it known that I, ALBERT R. BETHEL, a citizen of the United States, residing at Westport, in the county of Baltimore and State of Maryland, have invented certain new and useful Improvements in Apparatus for Milling Bottle-Molds, of which the following is a specification.

This invention relates to devices for supporting and feeding the work to be operated on by a rotary cutting tool, the tool in the present instance being a milling cutter, and the work being a mold for forming bottles and other glass articles. The mold is of that type having two pivotally connected sections in the meeting faces of which are cavities which register and form the mold opening. In this class of molds it is of the utmost importance that the cavities shall be accurately positioned relative to each other so that they may register correctly and also produce the exact shape of the required mold opening. The device which is the subject-matter of the present application for patent has therefore been devised to obtain this result, a work holder and feed device being provided by which the cutting operation is made with the greatest precision and economy.

In order that the invention may be better understood, reference is had to the accompanying drawings in which—

Figure 1 is an elevation of the apparatus;

Fig. 2 is a plan view thereof;

Fig. 3 is a cross-section on the line 3—3 of Fig. 2, and

Fig. 4 is a horizontal section on the line 4—4 of Fig. 1.

Referring specifically to the drawings, 5 and 6 denote the complemental half sections of the mold to be operated on, said sections having cavities 7 in their meeting faces which register to form the mold opening when the sections are closed up, said sections being provided with matching hinge knuckles 8 at one end for pivotal connection, so that they may be opened and closed. This is a common type of bottle mold, and a further description thereof is therefore deemed unnecessary.

The cavities 7 are made by a rotary milling cutter 9, the sections 5 and 6 being held and fed by a mechanism which assures accuracy of the milling operation. This mechanism comprises the following parts:

On the bed of the milling or other machine carrying the tool 9 is mounted a base plate 10 from which rise three uprights or posts 11, 12 and 13, respectively. These posts carry a clamping plate 14, between which latter and the base 10 the mold sections 5 and 6 are mounted. The post 11 passes through the knuckles 8 to provide a hinge or pivotal connection for the mold sections while being operated on, which is for a purpose to be presently described. The posts 12 and 13 are spaced a sufficient distance so as not to interfere with the swing of the mold sections. On the upper ends of the posts are screwed nuts 15 to hold the mold sections down on the base 10, the nuts being tightened just enough to hold the sections down without binding and interfering with the swing thereof.

In operation, the mold sections 5 and 6 are swung open a sufficient distance to permit the tool 9 to come between the opposite faces in which the cavities 7 are to be made, and the sections are then gradually closed up until said faces meet. It will therefore be seen that the mold sections are fed to the rotating tool and the latter cuts the cavities.

The swing of the mold sections 5 and 6 is effected by screws 16 connected to the free ends thereof, said ends having lugs 17 carrying vertical pins 18 on which are swiveled heads 19 on the inner ends of the screws. The outer ends of the screws are provided with hand wheels 20 for operating the same. Each screw is threaded through a nut 21 carried by a stem 22 which is swiveled on the base plate 10.

In the base plate 10 are openings 23 to discharge the chips, these openings extending in a circular series around a central opening 24 which is in line with the tool 9. In the opening 24 is mounted a bushing 25. The top plate 14 has a central opening 26 through which the tool extends. The base plate 10 has feet 27 for spacing it from the bed of the machine, so that the chips are free to discharge from the openings 23.

In order that the tool 9 may cut the cavities 7 true and accurate in both sections, the base plate has a stop lug 28 which is in the path of one of the mold sections 5 and 6, Fig. 4 showing it in the path of the section 6. This lug is so positioned that its side which intercepts the section 6 coincides with a straight line drawn from the center of the pivotal axis 11 of the sections through the center of the tool 9. Thus, when the section 6 reaches the lug, and the section 5
up against the section 6, the tool i
the same depth in both sections,
ties being exact semi-circles and f
true circle when they register. I
course, be understood that the sectic
first be brought to the stop lug, and
section 5 is swung over until it come
the section 6. At the beginning of
ting action, both sections will be s
multaneously or alternately, and w
are quite close together, the sectic
be advanced until it is stopped by
after which the section 5 is advan
it closes up against the section 6.
accuracy is therefore obtained witl
tle skill and attention on the part o
erator.

I claim:

1. The combination with a rotar
tool, of a holder for a piece of wo
is in sections in the meeting faces
the tool is to operate, said holder co
a base plate, means for pivotally
ing one side of the complemental l
the work sections to lie on opposite
the cutter, and means engaging the
sides of the work sections for a
them toward each other about sai
into engagement with the tool.

2. The combination with a rotar
tool, of a holder for a piece of wo
is in sections in the meeting faces
the tool is to operate, said holder
ing a base plate, means for pivot
porting the work sections to lie on
sides of the cutter, means for adva
work sections toward each other
gagement with the tool, posts risi
the base plate, and a top plate ca
the posts and engaging the top of
sections, said top plate having an
to accommodate the tool.

3. The combination with a rotar
tool, of a holder for a piece of wo
is in sections in the meeting faces
the tool is to operate, said holder
ing a base plate, means for pivot
porting one side of the complement
of the work sections to lie on oppo
of the cutter, means engaging the
sides of the work sections for a them toward each other about said pivots
into engagement with the tool, said means
comprising screws connected to the free
ends of the work sections, and nuts carried
by the base plate through which the screws
are threaded.

4. The combination with a rotary cutting
tool, of a holder for a piece of work which
is in sections in the meeting faces of which
the tool is to operate, said holder comprising
a base plate, means for pivotally supporting
one side of the complemental halves
of the work sections to lie on opposite sides
of the cutter, means engaging the opposite
sides of the work sections for advancing
them toward each other about said pivots
into engagement with the tool, and a stop
on the base plate intercepting one of the
work sections.

5. The combination with a rotary cutting
tool, of a holder for a piece of work which
is in sections in the meeting faces of which
the tool is to operate, said holder comprising
a base plate, means for pivotally supporting
the work sections to lie on opposite
sides of the cutter, means for advancing the
work sections toward each other into engagement
with the tool, and a stop on the
base plate intercepting one of the work sections,
the side of the stop which intercepts
said work section being so positioned that
it coincides with a straight line drawn from
the center of the pivotal axis of the work
sections through the center of the tool.

6. The combination with a rotary cutting
tool, of a holder for a piece of work which
is in sections in the meeting faces of which
the tool is to operate, said holder comprising
a base plate, a post rising from the base
plate and pivotally supporting one side of
the complemental halves of the work sections
to lie on opposite sides of the cutter,
and means engaging the opposite sides of
the work sections for advancing them toward
each other about said pivots into engagement
with the tool.

In testimony whereof I affix my signature
in presence of two witnesses.

ALBERT R. BETHEL.

Witnesses:
E. WALTON BREWINGTON,
HOWARD L. ADAMS.